United States Patent
Martin et al.

(10) Patent No.: US 9,391,366 B2
(45) Date of Patent: Jul. 12, 2016

(54) METHOD AND DEVICE FOR CALIBRATING A RECEIVER

(75) Inventors: Nicolas Martin, Bourg les Valence (FR); Jean-Michel Perre, St. Peray (FR); Vincent Chopard, Toumon sue Rhone (FR)

(73) Assignee: Thales, Courbevoie (FR)

( * ) Notice: Subject to any disclaimer, the term of this patent is extended or adjusted under 35 U.S.C. 154(b) by 627 days.

(21) Appl. No.: 13/421,678

(22) Filed: Mar. 15, 2012

(65) Prior Publication Data
US 2013/0044027 A1 Feb. 21, 2013

(30) Foreign Application Priority Data

Mar. 17, 2011 (FR) ...................... 11 00806

(51) Int. Cl.
*H01Q 3/36* (2006.01)
*G01S 19/23* (2010.01)
(Continued)

(52) U.S. Cl.
CPC ............... *H01Q 3/267* (2013.01); *G01S 19/23* (2013.01); *G01S 19/53* (2013.01)

(58) Field of Classification Search
CPC ................. G01S 19/23–19/235; G01S 19/53; H01Q 3/267
See application file for complete search history.

(56) References Cited

U.S. PATENT DOCUMENTS 5,025,493 A * 6/1991 Cook, Jr. ........................ 342/374
5,185,610 A * 2/1993 Ward et al. ................ 342/357.24
(Continued)

OTHER PUBLICATIONS

A.D. Poularikas, Adaptive Filtering: Fundamentals of Least Mean Squares with MATLAB®, p. 203-300, CRC Press 2014.*
(Continued)

*Primary Examiner* — Gregory C Issing
*Assistant Examiner* — Fred H Mull
(74) *Attorney, Agent, or Firm* — Michael J. Donohue; Davis Wright Tremaine LLP

(57) ABSTRACT

The invention relates to a method for calibrating an antenna of a receiver of signals ($s_1, \ldots, s_N$) originating from a plurality of sources, said receiver comprising a plurality of sensors ($c_1, \ldots, c_M$), characterized in that it comprises the following steps:
- measurement of a phase shift ($d_{m,n\ measure}$) for each of the sensors ($c_1, \ldots, c_M$) on each of the signals ($s_1, \ldots, s_N$),
- determination of at least one attitude value of the antenna, said attitude being defined by a set of coordinates,
- calculation, for each of the sensors on each of the signals, of a theoretical phase shift ($d_{m,n\ theoretical}$) as a function of the attitude of the antenna, from the directions of arrival of the signals,
- calculation of a bias ($\beta_{1\ sensor\ m}$) for each of the sensors from the measured phase shifts ($d_{m,n\ measure}$) and from the theoretical phase shifts ($d_{m,n\ theoretical}$) of the sensor.

20 Claims, 5 Drawing Sheets

(51) Int. Cl.
*G01S 19/53* (2010.01)
*H01Q 3/26* (2006.01)

(56) References Cited

U.S. PATENT DOCUMENTS

| | | | |
|---|---|---|---|
| 5,446,465 | A | 8/1995 | Diefes et al. |
| 5,561,432 | A | 10/1996 | Knight |
| 6,114,988 | A | 9/2000 | Schipper et al. |
| 6,163,754 | A | 12/2000 | Zhang |
| 2007/0247363 | A1* | 10/2007 | Piesinger ............... H01Q 3/267 342/368 |
| 2010/0063370 | A1* | 3/2010 | Hogan et al. .................. 600/316 |

OTHER PUBLICATIONS

Algorithm. (1992). Academic Press Dictionary of science and Technology. Oxford, United Kingdom: Elsevier Science & Technology. Retrieved from http://search.credoreference.com/content/entry/apdst/algorithm/0.*

Bias. (2001). Hargrave's Communications Dictionary. Hoboken, NJ: Wiley. Retrieved from http://search.credoreference.com/content/entry/hargravecomms/bias/0.*

Algorithm. (2011). The American Heritage Dictionary of the English Language. Boston, MA: Houghton Mifflin. Retrieved from http://search.credoreference.com/content/entry/hmdictenglang/algorithm/0.*

Calibrate. (2011). The American Heritage Dictionary of the English Language. Boston, MA: Houghton Mifflin. Retrieved from http://search.credoreference.com/content/entry/hmdictenglang/calibrate/0.*

Mar. 17, 2011—International Search Report, Institut National De Law Propriete Industrielle, Republique Francaise.

* cited by examiner

METHOD AND DEVICE FOR CALIBRATING A RECEIVER

TECHNICAL FIELD

The invention relates to radio navigation from sources emitting signals, in particular satellites, and more particularly the antenna calibration.

BACKGROUND OF THE INVENTION

Satellite radio navigation makes it possible to obtain the position of a receiver by a resolution similar to triangulation, by using the pseudo-distances measured from signals sent by satellites.

To receive signals originating from the satellites, it is possible to use, for example, a receiver provided with an antenna of CRPA (Controlled Radiation Pattern Antenna) type.

FIG. 1 represents the input stage of a receiver of satellite signals 100 according to the prior art. Conventionally, a receiver 100 provided with a CRPA antenna 101 comprises:
- an antenna 101 comprising a plurality of sensors 102,
- for each sensor 102, an analogue channel for filtering, amplifying, converting to intermediate frequency and digitizing the signals originating from the sensor (RF—radio frequency—and ADC—analogue-digital converter—block supplying a digitized signal $S_{sensor}$, M representing the number of sensors of the antenna),
- a digital antenna processing common to all the sensors (not represented in FIG. 1), which filters and combines the digitized sensor signals, which may be specific to each satellite direction,
- for each satellite signal, a digital signal processing (not represented in FIG. 1) which performs the demodulation (demodulation of the carrier and of the Doppler and unspreading by correlation with a local code) of the signal resulting from the digital antenna processing.

To enhance the performance of a CRPA antenna, it is known to implement different antenna processing methods. Some of these methods need the following data:

(i) the direction of the satellites in the antenna coordinate system (or sensor coordinate system), and (ii) phase shift biases $\beta_{sensor}$ induced by the analogue channels between the phase centre of each sensor and the analogue-digital converters.

The direction of the satellites is perfectly known in the TGL (local geographic trihedron, north, east, vertical coordinate system centred on the position of the receiver) coordinate system from ephemerides or almanacs. To deduce therefrom the direction in the sensor coordinate system, it is essential to know the attitude of the antenna relative to the TGL. The attitude is the orientation of the antenna relative to the three axes of a reference coordinate system, in this case the TGL coordinate system.

The attitude of the antenna is conventionally given by an attitude and heading inertial reference (AHRS—Attitude and Heading Reference System) hybridized with other sensors (anemometry, GPS, Doppler radar, etc.) or by a stand-alone inertial reference (IRS—Inertial Reference System).

It is also possible to determine the attitude of the antenna from the satellite signals themselves, which arrive with different phase shifts on the sensors, according to the incident direction.

In all cases, the attitude of the antenna, supplied by an inertial reference or identified from the satellite signals, makes it possible to determine the direction of the satellites in the antenna coordinate system.

As indicated above, some signal processing methods also require the knowledge of the biases of the sensors $\beta_{sensor}$.

Methods are known for identifying the biases of the sensors in the factory. However, this increases the cost of production of the equipment (calibration means and time spent) and do not make it possible to compensate for the ageing of the sensors which induces a variability of the bias.

It is also possible to provide the antenna electronics with an in-flight self-calibration device with its own calibration signal, but this does not make it possible to include the bias due to the sensor alone (the calibration signal being introduced between the antenna and the analogue reception subsystems, the calibration cannot therefore determine the defects in the sensors of the antenna) and increases the costs of the equipment because of the additional hardware.

Systems are known like those presented in the U.S. Pat. No. 5,446,465, which use double differences of the phase measurements which make it possible to completely eliminate the biases of the antenna sensors, in particular the (predominant) portion that is independent of the satellite directions (therefore common to all the satellite measurements). Thus, in this case, the search for the minimum of the minimization criterion for the root mean square value applied to the deviations between the measured double differences and the theoretical double differences must lead to zero for the correct attitude hypothesis. In these systems, the biases are processed as stray effects, which are tried to be disregarded.

SUMMARY OF THE INVENTION

The aim of the invention is to overcome the abovementioned problems by proposing a method and a device for calibrating the antenna of a receiver of signals originating from a plurality of satellites which would make it possible to determine biases of the sensors of an antenna of a radio navigation receiver. The determined biases take into account the ageing of the sensors.

To this end, the subject of the invention is a method for calibrating an antenna of a receiver of signals ($s_1, \ldots, s_N$) originating from a plurality of sources, said receiver comprising a plurality of sensors ($c_1, \ldots, c_M$), characterized in that it comprises the following steps:
- measurement (401) of a phase shift ($d_{m,n\ measure}$) for each of the sensors ($c_1, \ldots, c_M$) on each of the signals ($s_1, \ldots, s_N$),
- determination (402) of at least one attitude value of the antenna, said attitude being defined by a set of coordinates,
- calculation (403), for each of the sensors on each of the signals, of a theoretical phase shift ($d_{m,n\ theoretical}$) as a function of the attitude of the antenna, from the directions of arrival of the signals,
- calculation (404) of a bias ($\beta_{1\ sensor\ m}$) for each of the sensors from the measured phase shifts ($d_{m,n\ measure}$) and from the theoretical phase shifts ($d_{m,n\ theoretical}$) of the sensor.

The invention makes it possible to accurately determine the bias of the sensors of a signal receiver. This makes it possible to enhance the performance of the signal processing operations performed downstream of this receiver. Beam forming can be cited as an example.

The method according to the invention can be applied when the receiver is onboard a moving craft (terrestrial or airborne). Typically, it is possible to determine the biases of the sensors during a flight when the moving craft containing the receiver is an aircraft. This makes it possible to do away with a factory calibration which requires expensive means and which can therefore prove costly. Furthermore, the bias of the sensors can change over time. The factory calibration may therefore become obsolete. The in-flight calibration can be repeated periodically and the values of the biases of the sensors can be kept up to date over time.

The invention therefore makes it possible to use the measured phase shifts between the sensors No. 2, 3, ... and a sensor No. 1, which can be likened to simple differences. The invention therefore makes it possible to estimate these biases in order to improve, for example, antenna processing.

According to a variant of the invention, the step (402) of determination of at least one attitude value of the antenna comprises the determination of a single value determined by suitable measurement means.

Advantageously, the calculation (404) of a bias ($\beta_{1\ sensor\ m}$) for each of the sensors from the measured phase shifts ($d_{m,n\ measure}$) and from the theoretical phase shifts ($d_{m,n\ theoretical}$) of the sensor is performed using a least squares method.

According to a variant of the invention, the method also comprises the following steps:
 the step (402) of determination of at least one attitude value of the antenna comprises the determination of a plurality of antenna attitude hypotheses,
 for each determined attitude hypothesis,
  calculation (404) of a bias ($\beta_{1\ sensor\ m}$) for each of the sensors from the measured phase shifts ($d_{m,n\ measure}$) and from the theoretical phase shifts ($d_{m,n\ theoretical}$) of the sensor,
  calculation (405) of a likelihood indicator ($\Phi$) of the attitude hypothesis, from the measured phase shifts ($d_{m,n\ measure}$), from the theoretical phase shifts ($d_{m,n\ theoretical}$) and from the calculated biases ($\beta_{1\ sensor\ m}$),
 selection (406) of the biases for which the value of the likelihood indicator is the lowest.

Advantageously, the calculation (403), for each of the sensors on each of the signals, of theoretical phase shift ($d_{m,n\ theoretical}$) also takes into account predetermined values of the sensor biases ($\beta_{0\ sensor\ m}$) linked to receiver defects and dependent on the direction of arrival of the source signals, the purpose of the calibration being to identify residual sensor biases ($\beta_{1\ sensor\ m}$) independent of the direction of arrival of the signals.

Advantageously, the coordinates defining the attitude of the antenna being a heading ($\psi$), a trim ($\theta$) and an inclination ($\phi$), the calculation of the likelihood indicator ($\Phi$) comprises the calculation of a residue for each signal/sensor pair, the residue for a given sensor and signal according to the relationship:

$$\rho_{m,n}(\psi,\theta,\phi)=d_{m,n\ measured}-d_{m,n\ theoretical}(\psi,\theta,\phi)-\hat{\beta}_{1\ sensor\ m}(\psi,\theta,\phi),$$

with $\rho_{m,n}(\psi,\theta,\phi)$ being the residue associated with the pair comprising signal n and sensor m, $d_{m,n\ measure}$ being the measured phase shift for the sensor m for the signal n, $d_{m,n\ theoretical}(\psi,\theta,\phi)$ being the theoretical phase shift for the sensor m for the signal n and for the heading $\psi$, the trim $\theta$ and the inclination $\phi$, $\hat{\beta}_{1\ sensor\ m}(\psi,\theta,\phi)$ being an estimated value of the bias of the sensor m for the heading $\psi$, the trim $\theta$ and the inclination $\phi$, and in that the likelihood indicator is a weighted sum of the squares of the residues according to the following relationship:

$$\Phi(\psi,\theta,\varphi)=\sum_{m=2}^{M}\sum_{n=1}^{N}w(\sigma_n,\alpha_n)\cdot|\rho_{m,n}(\psi,\theta,\varphi)|^2$$

with $\Phi(\psi,\theta,\phi)$ being the likelihood indicator for the heading $\psi$, the trim $\theta$ and the inclination $\phi$, $\rho_{m,n}(\psi,\theta,\phi)$ being the residue associated with the pair comprising signal n and sensor m and $w(\sigma_n, \alpha_n)$ being a weighting of the source n, dependent on $\sigma_n$, the angle of elevation in the sensor coordinate system and on $\alpha_n$, the azimuth angle in the sensor coordinate system.

Advantageously, the calculation (404) of a bias $\beta_{1\ sensor\ m}$ for each of the sensors from the measured phase shifts ($d_{m,n\ measure}$) and from the theoretical phase shifts ($d_{m,n\ theoretical}$) of the sensor is performed according to a weighted least squares method.

Advantageously, the bias of the sensors being independent of the direction of arrival of the signals, the calculation (404) of a bias $\beta_{1\ sensor\ m}$ for each of the sensors from the measured phase shifts ($d_{m,n\ measure}$) and from the theoretical phase shifts ($d_{m,n\ theoretical}$) of the sensor is performed according to a weighted average, $$\tilde{\beta}_{1\ sensor\ m}(\psi,\theta,\varphi)=\frac{1}{N}\sum_{n=1}^{N}w(\sigma_n,\alpha_n)\cdot(d_{m,n\ measured}-d_{m,n\ theoretical}(\psi,\theta,\varphi))$$

with $\tilde{\beta}_{1\ sensor\ m}(\psi,\theta,\phi)$ being the bias of a sensor m, for the heading $\psi$, the trim $\theta$ and the inclination $\phi$ and $w(\sigma_n, \alpha_n)$ being a weighting of the source n, dependent on $\sigma_n$, the angle of elevation in the sensor coordinate system and on $\alpha_n$, the azimuth angle in the sensor coordinate system.

Advantageously, the purpose of the calibration being to identify residual biases ($\beta_{1\ sensor\ m}$) dependent on the direction of arrival of the signals, the biases of the sensors are expressed by linear combinations, comprising coefficients, functions of the directions of arrival of the signals in the antenna coordinate system.

Advantageously, the coefficients of the linear combinations are determined by means of a weighted least squares method.

Advantageously, the coordinates defining the attitude of the antenna being a heading ($\psi$), a trim ($\theta$) and an inclination ($\phi$), the calculation of the likelihood indicator ($\Phi$) follows the following relationship:

$$\Phi(\psi,\theta,\varphi)=\sum_{m=2}^{M}\left\|W^{1/2}(H_m\hat{X}_m-Z_m)\right\|^2=\sum_{m=2}^{M}(H_m\hat{X}_m-Z_m)^T W(H_m\hat{X}_m-Z_m)$$

with $\Phi(\psi,\theta,\phi)$ being the likelihood indicator for the heading $\psi$, the trim $\theta$ and the inclination $\phi$, and W being a diagonal weighting matrix, H being a matrix of the functions of the directions of arrival of the signals in the antenna coordinate system, X being a matrix of coefficients and Z being defined as $$Z_m = \begin{bmatrix} d_{m,1\ measured} - d_{m,1\ theoretical}(\psi, \theta, \varphi) \\ \vdots \\ d_{m,n\ measured} - d_{m,n\ theoretical}(\psi, \theta, \varphi) \\ \vdots \\ d_{m,N\ measured} - d_{m,N\ theoretical}(\psi, \theta, \varphi) \end{bmatrix}_{N \times 1}.$$

Advantageously, the steps of determination of an antenna attitude hypothesis and of calculation of biases are performed iteratively and comprise steps of:

initialization (501) of a so-called preceding hypothesis $(\psi_{n-1}, \theta_{n-1}, \phi_{n-1})$, calculation (502) of a current hypothesis $(\psi_n, \theta_n, \phi_n)$ from the preceding hypothesis $(\psi_{n-1}, \theta_{n-1}, \phi_{n-1})$, calculation of the sums of the residues squared (503) from the current hypothesis $(\psi_n, \theta_n, \phi_n)$, calculation (504) of a gradient from the sums of the residues squared, comparison (505) of the gradient with a predetermined threshold (S), if the gradient is below the threshold (S) then the calibration is finished (506), otherwise return to the step (502) of calculation of a current hypothesis with the current hypothesis as preceding hypothesis.

According to one embodiment of the invention, the calculation (502) of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \Phi(\psi_n, \theta_n, \varphi_n) \cdot \frac{\vec{Grad}\Phi(\psi_n, \theta_n, \varphi_n)}{\|\vec{Grad}\Phi(\psi_n, \theta_n, \varphi_n)\|^2} \text{ with}$$

$$\vec{Grad}\Phi(\psi, \theta, \varphi) \stackrel{def}{=} \begin{bmatrix} \frac{\partial \Phi}{\partial \psi}(\psi, \theta, \varphi) \\ \frac{\partial \Phi}{\partial \theta}(\psi, \theta, \varphi) \\ \frac{\partial \Phi}{\partial \varphi}(\psi, \theta, \varphi) \end{bmatrix}$$

with $\vec{Grad}\Phi$ being the gradient of the likelihood indicator that is a function of $\psi$, the heading, $\theta$, the trim, and $\phi$, the inclination.

According to another embodiment of the invention, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \alpha \cdot \vec{Grad}\Phi(\psi_n, \theta_n, \varphi_n)$$

with $\alpha$ being a realignment coefficient whose value is chosen to be between 0 and 1, in a fixed or changing manner.

The invention also relates to a receiver of source signals comprising a plurality of sensors distributed over an antenna, means for digitizing the signals originating from said sensors, a signal processing device (701) suitable for processing the signal comprising:

a first module (601) suitable for calculating correlated signals $(Z_1, \ldots, Z_M)$ from the signals received by the sensors $(c_1, \ldots, c_M)$ and corresponding to said source $(s_n)$, said correlated signals $(Z_1, \ldots, Z_M)$, resulting from the correlation of the signals received respectively on the sensors $(c_1, \ldots, c_M)$ by a local signal consisting of a complex carrier and a spreading code specific to the corresponding source $(S_n)$, a second module (602) suitable for determining phase shift measurements $(d_{m,n\ measure})$ for each of the sensors $(c_1, \ldots, c_M)$ on the signal originating from said source $(s_n)$, from the correlated signals $(Z_1, \ldots, Z_M)$, and means for implementing the method (702) according to the technical characteristics presented previously.

BRIEF DESCRIPTION OF THE DRAWINGS

The invention will be better understood and other benefits will become apparent from reading the detailed description given as a non-limiting example and by using the figures in which.

DETAILED DESCRIPTION OF THE INVENTION

The invention is described below, as a non-limiting example, through an embodiment in which the signal sources are satellites. Alternatively, the signal sources may be pseudolites, in other words, terrestrial transmitters on the ground or onboard moving craft.

Figure 1:
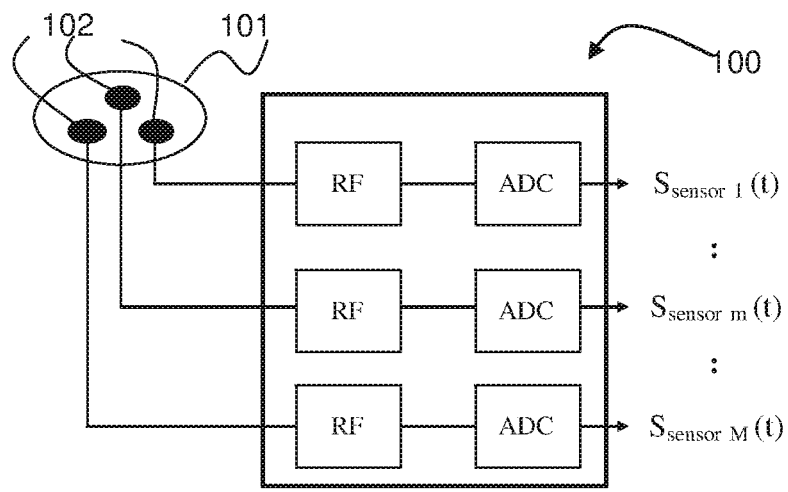
FIG. 1, already presented, represents a receiver of satellite signals according to the prior art.
Figure 2:
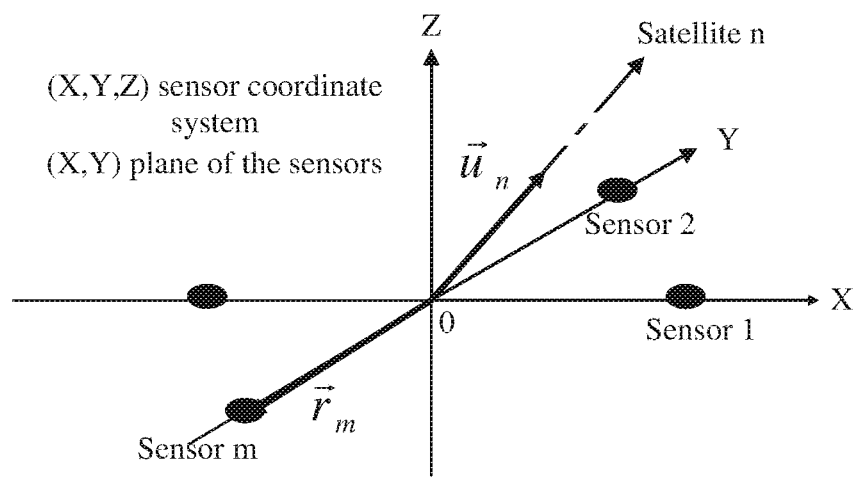
FIG. 2 represents an antenna-satellite distance vector in the sensor coordinate system.

In FIG. 2, a plurality of sensors can be distinguished (sensor 1, sensor 2, sensor m, ...) represented by black dots. The figure also represents a coordinate system, called sensor coordinate system, comprising three axes X, Y and Z. The sensors are all situated in the plane defined by the X and Y axes. The antenna-satellite n directing vector in the sensor coordinate system $\vec{u}_n$ is defined as follows:

$$\vec{u}_{n\ sensors}(\psi, \theta, \varphi) = \begin{bmatrix} X_n \\ Y_n \\ Z_n \end{bmatrix} / \rho :$$

in which $\rho$ is the antenna-satellite n distance with $\rho = \sqrt{X_n^2 + Y_n^2 + Z_n^2}$ $X_n$, $Y_n$, and $Z_n$ being the coordinates of the satellite in the sensor coordinate system.

The position vector of the sensor m in the sensor coordinate system $\vec{r}_m$ is known without error and is defined as follows:

$$\vec{r}_{m\ sensors} = \begin{bmatrix} X_{sensor\ m} \\ Y_{sensor\ m} \\ Z_{sensor\ m} \end{bmatrix}$$

with $X_{sensor\ m}$, $Y_{sensor\ m}$, and $Z_{sensor\ m}$ being the coordinates of the sensor in the sensor coordinate system.

$$D_{n\ measured} = \begin{bmatrix} 0 \\ d_{2,n\ measured} \\ d_{m,n\ measured} \\ \vdots \\ d_{M,n\ measured} \end{bmatrix}_{M \times 1}$$

Phase shifts measured on the M sensors for the satellite n $d_{m,n\ measure}$: Phase shifts measured on the sensor m relative to the sensor 1, on the signal from the satellite n.

The invention relates to a method for calibrating an antenna of a receiver of signals ($s_1, \ldots, s_N$) originating from a plurality of sources, said receiver comprising a plurality of sensors ($c_1, \ldots, c_M$), characterized in that it comprises the following steps:

- measurement (401) of a phase shift ($d_{m,n\ measure}$) for each of the sensors ($c_1, \ldots, c_M$) on each of the signals ($s_1, \ldots, s_N$),
- determination (402) of at least one attitude value of the antenna, said attitude being defined by a set of coordinates,
- calculation (403), for each of the sensors on each of the signals, of a theoretical phase shift ($d_{m,n\ theoretical}$) as a function of the attitude of the antenna, from the directions of arrival of the signals,
- calculation (404) of a bias (β1 sensor m) for each of the sensors from the measured phase shifts (dm,n measure) and from the theoretical phase shifts (dm,n theoretical) of the sensor.

According to a variant embodiment of the invention, the attitude of the antenna can be determined trivially using suitable measurement means. Such is the case notably when the antenna is fixed or when there is an inertial unit available determining the attitude of the antenna.

In this variant embodiment of the invention, the calculation 404 of a bias $\beta_{1\ sensor\ m}$ for each of the sensors from the measured phase shifts $d_{m,n\ measure}$ and from the theoretical phase shifts $d_{m,n\ theoretical}$ of the sensor can be performed using a least squares method.

Hereinafter in the description, it is assumed that the attitude of the antenna is not known. In this other variant embodiment of the invention, the attitude of the antenna is not known a priori. It is determined using signals. The method for calibrating an antenna of a receiver also comprises the following steps:

- the step (402) of determination of at least one attitude value of the antenna comprises the determination (402) of a plurality of antenna attitude hypotheses, said attitude being defined by a set of coordinates,
- for each determined attitude hypothesis,
  calculation (404) of a bias ($\beta_{1\ sensor\ m}$) for each of the sensors from the measured phase shifts ($d_{m,n\ measure}$) and from the theoretical phase shifts ($d_{m,n\ theoretical}$) of the sensor,
  calculation (405) of a likelihood indicator (Φ) of the attitude hypothesis, from the measured phase shifts ($d_{m,n\ measure}$), from the theoretical phase shifts ($d_{m,n\ theoretical}$) and from the calculated biases ($\beta_{1\ sensor\ m}$),
- selection (406) of the biases for which the value of the likelihood indicator is the lowest.

According to a first embodiment, the biases $\beta_{0\ sensor\ m}(\sigma,\alpha)$ are predetermined, identified in the factory and stored in the receiver. The aim of the calibration is then to identify residual biases $\beta_{1\ sensor\ m}$ that are independent of the direction of the satellite.

$d_{1,n\ theoretical}(\psi,\theta,\phi)=0$ by definition $d_{m,n\ theoretical}(\psi,\theta,\phi)=2\pi \cdot \vec{u}_{n\ sensors}(\psi,\theta,\phi) \cdot (\vec{r}_{m\ sensors} - \vec{r}_{1\ sensors})/\lambda + \beta_{0\ sensor\ m}(\sigma_n,\alpha_n)$ The direction of arrival of the satellite n signal is represented in the sensor coordinate system by the directing vector $\vec{u}_{n\ sensors}$:

$$\vec{u}_{n\ sensors} = \begin{bmatrix} \cos(\alpha_n) \cdot \cos(\sigma_n) \\ \sin(\alpha_n) \cdot \cos(\sigma_n) \\ \sin(\sigma_n) \end{bmatrix} = \begin{bmatrix} ux_n \\ uy_n \\ uz_n \end{bmatrix}$$

with $\sigma_n$ being the angle of elevation in the sensor coordinate system:

$\sigma_n = \sin^{-1}(uz_n/\sqrt{(ux_n^2+uy_n^2)}) = \sigma_n(\psi,\theta,\phi)$ with $\alpha_n$ being the azimuth angle in the sensor coordinate system:

$\alpha_n = \cos^{-1}(ux_n/uy_n) = \alpha_n(\psi,\theta,\phi)$

The tabulation of $\beta_{0\ sensor\ m}$ is done as a function of the angles of elevation σ and of azimuth α.

The attitude of the antenna is represented relative to the TGL coordinate system using the Euler angles: heading (ψ), trim (θ) and inclination (φ). These angles make it possible to construct the coordinate system change matrix:

$$M(\psi, \theta, \varphi) =$$
$$\begin{bmatrix} 1 & 0 & 0 \\ 0 & \cos\varphi & -\sin\varphi \\ 0 & \sin\varphi & \cos\varphi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\psi & \sin\psi & 0 \\ -\sin\psi & \cos\psi & 0 \\ 0 & 0 & 1 \end{bmatrix} \begin{bmatrix} X \\ Y \\ Z \end{bmatrix} =$$

$$M(\psi, \theta, \varphi) \cdot \begin{bmatrix} X_{TGL} \\ Y_{TGL} \\ Z_{TGL} \end{bmatrix}$$

$\vec{u}_{n\ sensors}(\psi, \theta, \varphi) = M(\psi, \theta, \varphi) \cdot \vec{u}_{n\ TGL}$ $\vec{u}_{n\ TGL} = \begin{bmatrix} X_{nTGL} \\ Y_{nTGL} \\ Z_{nTGL} \end{bmatrix} / \rho$:

Antenna—satellite n directing vector in the TGL coordinate system
$\rho = \sqrt{X_n^2+Y_n^2+Z_n^2} = \sqrt{X_{nTGL}^2+Y_{nTGL}^2+Z_{nTGL}^2}$: Antenna-satellite n distance $X_{nTGL}$, $Y_{nTGL}$, and $Z_{nTGL}$ being the coordinates of the satellite in the TGL coordinate system.

$\vec{u}_{n\ TGL}$ is known without error from ephemerides.

Figure 3:
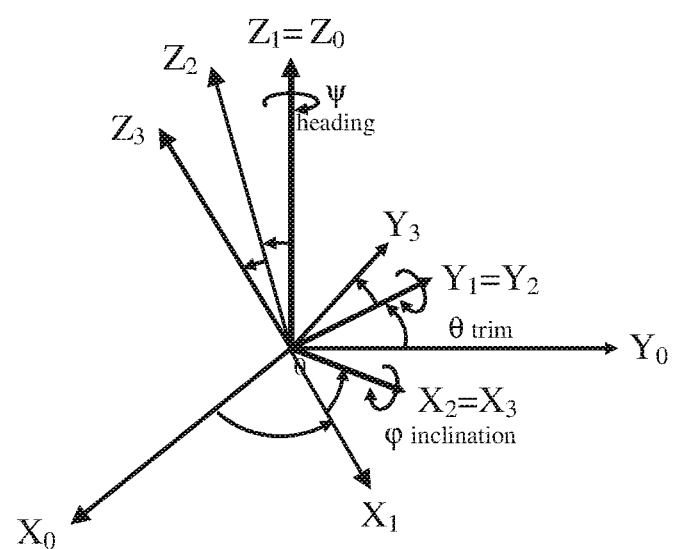
FIG. 3 illustrates coordinates defining the attitude of the antenna in a TGL coordinate system.
Figure 4:
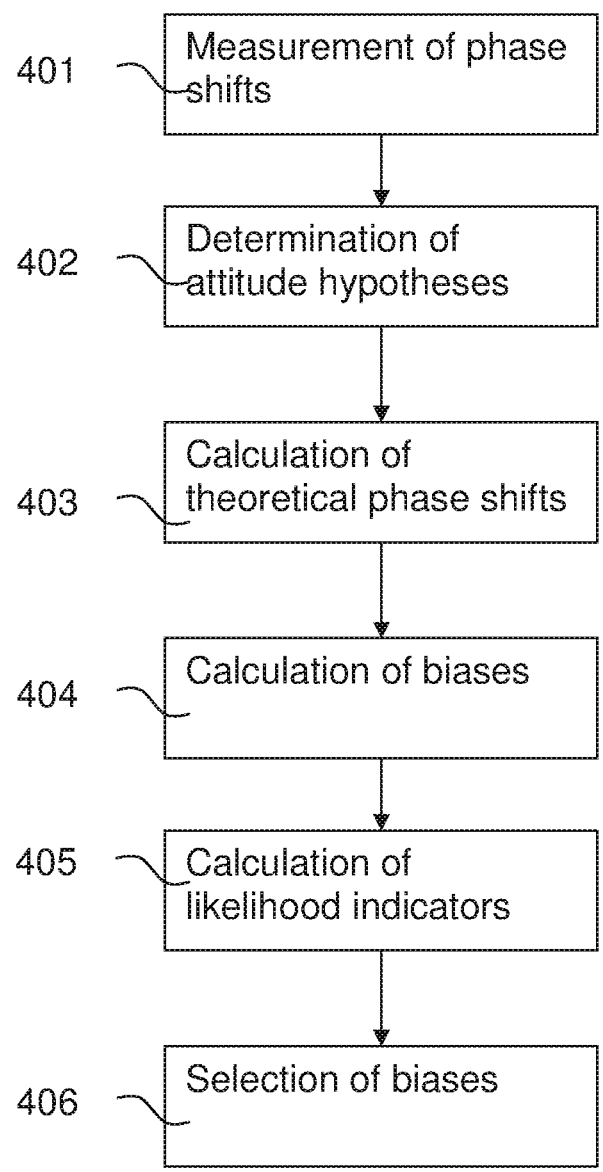
FIG. 4 shows a diagram illustrating the method according to the invention.
Figure 5:
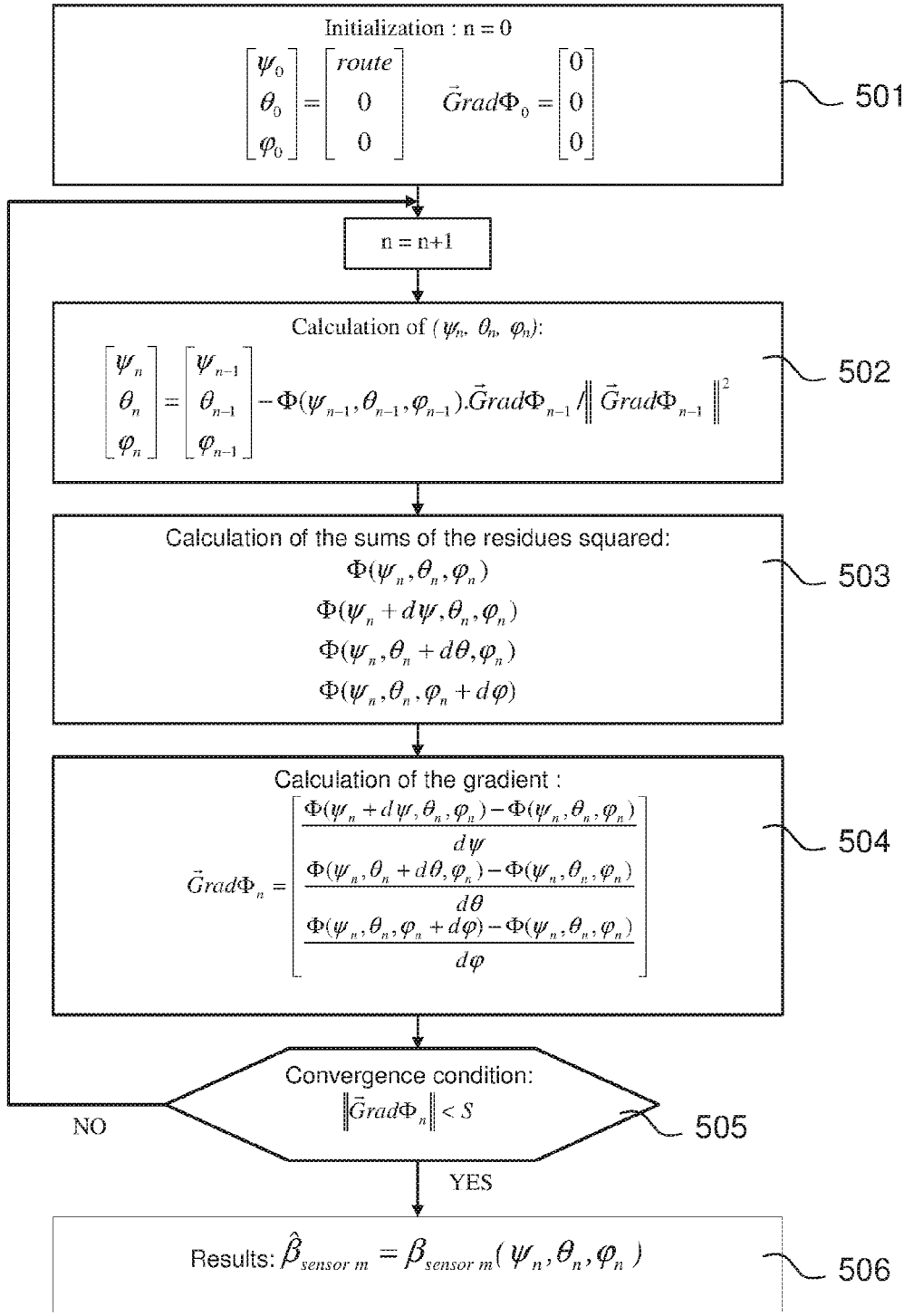
FIG. 5 shows a diagram illustrating a variant embodiment of the method according to the invention.

FIG. 3 shows the Euler angles (ψ, θ, φ) representing the angles of three successive rotations changing the origin coordinate system (TGL) in which the coordinates are (X0,Y0,Z0) to the arrival coordinate system (sensor coordinate system) in which the coordinates are (X3,Y3,Z3).

$\beta_{0\ sensor\ m}(\sigma,\alpha)$ denotes the upstream bias of the sensor m due to the antenna and which depends on the direction of arrival of the signal (also called directional bias). The upstream bias $\beta_{0\ sensor\ m}(\sigma,\alpha)$ is assumed constant in time. It can be determined in the factory.

$\beta_{1\ sensor\ m}$ denotes the bias of the sensor m due to the analogue channels between the output of the antenna and the ADC. The bias $\beta_{1\ sensor\ m}$ is constant relative to the direction of arrival of the signal.

The bias $\beta_{1\ sensor\ m}$ is variable in time (notably because of the temperature and the ageing of the sensor). It therefore requires in-flight calibration.

According to one feature of the invention, the calculation (404) of a bias ($\beta$) for each of the sensors from the measured phase shifts ($d_{m,n\ measure}$) and from the theoretical phase shifts ($d_{m,n\ theoretical}$) of the sensor is performed according to a weighted least squares method.

In this first embodiment, the following equation system is posited, which is exact to within the tolerance of the measurement noises:

$$\begin{cases} d_{2,n\ measured} = d_{2,n\ theoretical}(\psi, \theta, \varphi) + \beta_{1\ sensor\ 2} & \text{for } n = 1, 2, \ldots N \\ \vdots \\ d_{m,n\ measured} = d_{m,n\ theoretical}(\psi, \theta, \varphi) + \beta_{1\ sensor\ m} & \text{for } n = 1, 2, \ldots N \\ \vdots \\ d_{M,n\ measured} = d_{M,n\ theoretical}(\psi, \theta, \varphi) + \beta_{1\ sensor\ M} & \text{for } n = 1, 2, \ldots N \end{cases}$$

There are N×(M−1) equations in which N is the number of satellites and M the number of sensors. There are 3+(M−1) unknowns: $\psi, \theta, \phi$ and $\beta_{1\ sensor\ 2}, \ldots \beta_{1sensor\ n}$. At least N×(M−1)≥3+(M−1) or (N−1)×(M−1)≥3 are needed to have a determined solution.

If there are exactly (N−1)×(M−1)=3 a solution to the system is found regardless of the noise values, but without the benefit of any measurement redundancy, therefore very sensitive to the noise.

Beyond this figure there is no "exact" solution to the system because of the measurement noises which make the measurements inconsistent (and possibly because of the badly calibrated variations of the sensor biases $\beta_{0\ sensor\ m}(\sigma,\alpha)$ as a function of the direction of arrival of the signals due to the coupling of the sensors). However, there is an approximate solution, for example that which minimizes the sums of the squares of the residues, which will benefit from the measurement redundancy to average the noises.

The system to be resolved is not linear because of the trigonometrical functions which link the Euler angles to the theoretical phase shifts $d_{m,n\ theoretical}(\psi,\theta,\phi)$. It is therefore not possible to use the linear resolution method minimizing the sums of the squares of the residues, called "least squares" or "linear regression" methods.

An iterative search method is used in the three-dimensional domain ($\psi, \theta, \phi$): for each triplet of values considered for the Euler angles, a new system is resolved with (M−1) unknowns and N×(M−1) equations (the 3 unknowns $\psi, \theta, \phi$ are considered to be constants) which is linear:

$$\begin{cases} d_{2,n\ measured} - d_{2,n\ theoretical}(\psi, \theta, \varphi) = \beta_{1\ sensor\ 2} & \text{for } n = 1, 2, \ldots N \\ \vdots \\ d_{m,n\ measured} - d_{m,n\ theoretical}(\psi, \theta, \varphi) = \beta_{1\ sensor\ m} & \text{for } n = 1, 2, \ldots N \\ \vdots \\ d_{M,n\ measured} - d_{M,n\ theoretical}(\psi, \theta, \varphi) = \beta_{1\ sensor\ M} & \text{for } n = 1, 2, \ldots N \end{cases}$$

In this case, the resolution in the least squares sense is simple, all that is needed is to take the averages of the lefthand terms for each sensor:

$$\begin{cases} \tilde{\beta}_{1\ sensor\ 2}(\psi, \theta, \varphi) = \frac{1}{N}\sum_{n=1}^{N}(d_{2,n\ measured} - d_{2,n\ theoretical}(\psi, \theta, \varphi)) \\ \vdots \\ \tilde{\beta}_{1\ sensor\ m}(\psi, \theta, \varphi) = \frac{1}{N}\sum_{n=1}^{N}(d_{m,n\ measured} - d_{m,n\ theoretical}(\psi, \theta, \varphi)) \\ \vdots \\ \tilde{\beta}_{1\ sensor\ M}(\psi, \theta, \varphi) = \frac{1}{N}\sum_{n=1}^{N}(d_{M,n\ measured} - d_{M,n\ theoretical}(\psi, \theta, \varphi)) \end{cases}$$

According to one feature of the invention, the coordinates defining the attitude of the antenna being a heading ($\psi$), a trim ($\theta$) and an inclination ($\psi$), the calculation (405) of the likelihood indicator ($\Phi$) comprises the calculation of a residue for each signal/sensor pair, the residue for a given sensor and signal according to the relationship:

$$\rho_{m,n}(\psi,\theta,\phi) = d_{m,n\ measured} - d_{m,n\ theoretical}(\psi,\theta,\phi) - \tilde{\beta}_{1\ sensor\ m}(\psi,\theta,\phi),$$

with $\rho_{m,n}(\psi,\theta,\phi)$ being the residue associated with the pair comprising signal n and sensor m, $d_{m,n\ measure}$ being the measured phase shift for the sensor m for the signal n, $d_{m,n\ theoretical}(\psi,\theta,\phi)$ being the theoretical phase shift for the sensor m for the signal n and for the heading $\psi$, the trim $\theta$ and the inclination $\phi$, $\beta_m(\psi,\theta,\phi)$ being the bias of the sensor m for the heading $\psi$, the trim $\theta$ and the inclination $\phi$.

According to a first variant embodiment of the invention, the likelihood indicator is the sum of the squares of the residues according to the following relationship:

$$\Phi(\psi, \theta, \varphi) = \sum_{m=2}^{M}\sum_{n=1}^{N}|\rho_{m,n}(\psi, \theta, \varphi)|^2$$

with $\Phi(\psi,\theta,\phi)$ being the likelihood indicator for the heading $\psi$, the trim $\theta$ and the inclination $\phi$, $\rho_{m,n}(\psi,\theta,\phi)$ being the residue associated with the pair comprising signal n and sensor m.

The sum of the squares of the residues is a good indication of the likelihood of the hypothesis ($\psi,\theta,\phi$) considered. If the noises $v_{m,n}$ are zero and if (N−1)×(M−1)>3, then $\Phi(\psi,\theta,\phi)$ will be zero, provided that the values of the Euler angles considered are the correct values.

According to a second variant embodiment of the invention, when the calibration of the antenna biases $\beta_{0\ sensor\ m}(\sigma,\alpha)$ is not possible (by default, zero values are taken) or imperfect, it may be shrewd to weight the phase shift measurements to give less importance to those corresponding to low satellites in the antenna coordinate system. In practice, it is at low elevations that the calibration of the antenna is most difficult because of the strong variations as a function of the elevation and azimuth.

$$\begin{cases} \tilde{\beta}_{1\ sensor\ 2}(\psi, \theta, \varphi) = \frac{1}{N}\sum_{n=1}^{N}w(\sigma_n, \alpha_n) \cdot \frac{(d_{2,n\ measured} - }{d_{2,n\ theoretical}(\psi, \theta, \varphi))} \\ \vdots \\ \tilde{\beta}_{1\ sensor\ m}(\psi, \theta, \varphi) = \frac{1}{N}\sum_{n=1}^{N}w(\sigma_n, \alpha_n) \cdot \frac{(d_{m,n\ measured} - }{d_{m,n\ theoretical}(\psi, \theta, \varphi))} \\ \vdots \\ \Phi(\psi, \theta, \varphi) = \sum_{m=2}^{M}\sum_{n=1}^{N}w(\sigma_n^{-1}, \sum_{n=1}^{N})\cdot|\rho_{m,n}(\psi, \theta, \varphi)|^2 \frac{(d_{M,n\ measured} - }{d_{M,n\ theoretical}(\psi, \theta, \varphi))} \end{cases}$$

with $w(\sigma_n,\alpha_n)$ being a weighting of the satellite n, dependent on the attitude hypothesis:

$$w(\sigma_n,\alpha_n) = w(\sigma_n(\psi,\theta,\phi),\alpha_n(\psi,\theta,\phi)) = w_n(\psi,\theta,\phi)$$

A sum standardized at 1 is needed:

$$w(\sigma_n, \alpha_n) = \frac{f(\sigma_n, \alpha_n)}{\sum_{n=1}^{N} f(\sigma_n, \alpha_n)} \text{ such that:}$$

$$\sum_{n=1}^{N} w(\sigma_n, \alpha_n) = 1$$

It is possible, for example, to take a function which depends on the elevation of the satellite in the sensor coordinate system:

$$f(\sigma_n, \alpha_n) = \frac{\sigma_n}{1 + \sigma_n}$$

However, it is not always easy to identify the directional biases of the sensors in the factory. In a second embodiment, the aim of the calibration is to determine sensor biases $\beta_{1\ sensor\ m}$ which depend on the direction of arrival of the signal.

$$\begin{cases} d_{2,n\ measured} - d_{2,n\ theoretical}(\psi, \theta, \varphi) = \\ \quad \beta_{1\ sensor\ 2}(\sigma_n, \alpha_n) \quad \text{for } n = 1, 2, \ldots N \\ \vdots \\ d_{m,n\ measured} - d_{m,n\ theoretical}(\psi, \theta, \varphi) = \\ \quad \beta_{1\ sensor\ m}(\sigma_n, \alpha_n) \quad \text{for } n = 1, 2, \ldots N \\ \vdots \\ d_{M,n\ measured} - d_{M,n\ theoretical}(\psi, \theta, \varphi) = \\ \quad \beta_{1\ sensor\ M}(\sigma_n, \alpha_n) \quad \text{for } n = 1, 2, \ldots N \end{cases}$$

To limit the number of unknown parameters to be identified (the greater the number of parameters, the greater the sensitivity to the noise, because there are fewer measurement redundancies relative to the number of unknowns), each of the biases is modelled by a linear function combination dependent on the directions of arrival, represented by the angle of elevation $\sigma$ and of azimuth $\alpha$ (angles in the sensor coordinate system).

$$d_{2,n\ measured} - d_{2,n\ theoretical}(\psi, \theta, \varphi) = a_{1,2} \cdot f_{1,2}(\sigma_n, \alpha_n) + a_{2,2} \cdot f_{2,2}(\sigma_n, \alpha_n) + \ldots + a_{P,2} \cdot f_{P,2}(\sigma_n, \alpha_n)$$
$$\vdots$$
$$d_{m,n\ measured} - d_{m,n\ theoretical}(\psi, \theta, \varphi) = a_{1,m} \cdot f_{1,m}(\sigma_n, \alpha_n) + a_{2,m} \cdot f_{2,m}(\sigma_n, \alpha_n) + \ldots + a_{P,m} \cdot f_{P,m}(\sigma_n, \alpha_n)$$
$$\vdots$$
$$d_{M,n\ measured} - d_{M,n\ theoretical}(\psi, \theta, \varphi) = a_{1,M} \cdot f_{1,M}(\sigma_n, \alpha_n) + a_{2,M} \cdot f_{2,M}(\sigma_n, \alpha_n) + \ldots + a_{P,M} \cdot f_{P,M}(\sigma_n, \alpha_n)$$

for $n = 1, 2, \ldots N$

For each attitude hypothesis $(\psi, \theta, \phi)$ considered, there are $(M-1) \times P$ unknowns and $(M-1) \times N$ equations (phase shift measurements). To have a single hypothesis $(\psi, \theta, \phi)$ which gives a sum of the residues that is zero or close to zero the following is needed: $(M-1) \times P + 3 < (M-1) \cdot N$ If $M > 3$, it is sufficient to have $N > P$.

The system is resolved for each sensor ($m = 2$ to $M$) by the least squares:

$$H_m X_m = Z_m$$

$$X_m = \begin{bmatrix} a_{1,m} \\ a_{2,m} \\ \vdots \\ a_{P,m} \end{bmatrix}_{P \times 1}$$

$$H_m = \begin{bmatrix} f_{1,m}(\sigma_1, \alpha_1) & f_{2,m}(\sigma_1, \alpha_1) & \cdots & f_{P,m}(\sigma_1, \alpha_1) \\ \vdots & \vdots & & \vdots \\ f_{1,m}(\sigma_n, \alpha_n) & f_{2,m}(\sigma_n, \alpha_n) & \cdots & f_{P,m}(\sigma_n, \alpha_n) \\ \vdots & \vdots & & \vdots \\ f_{1,m}(\sigma_N, \alpha_N) & f_{2,m}(\sigma_N, \alpha_N) & \cdots & f_{P,m}(\sigma_N, \alpha_N) \end{bmatrix}_{N \times P}$$

$$Z_m = \begin{bmatrix} d_{m,1\ measured} - d_{m,1\ theoretical}(\psi, \theta, \varphi) \\ \vdots \\ d_{m,n\ measured} - d_{m,n\ theoretical}(\psi, \theta, \varphi) \\ \vdots \\ d_{m,N\ measured} - d_{m,N\ theoretical}(\psi, \theta, \varphi) \end{bmatrix}_{N \times 1}$$

$\hat{X}_m = H_m^* Z_m$ with the pseudo-inverse matrix:

$$H_m^* = (H_m^T H_m)^{-1} H_m^T$$

with weighting:

$$W^{1/2} H_m X_m = W^{1/2} Z_m$$

$$W^{1/2} = \begin{bmatrix} \sqrt{w_1} & 0 & \cdots & \cdots & 0 \\ 0 & \cdots & 0 & & \vdots \\ \vdots & 0 & \sqrt{w_n} & 0 & \vdots \\ \vdots & & 0 & \cdots & 0 \\ 0 & \cdots & \cdots & 0 & \sqrt{w_N} \end{bmatrix}_{N \times 1}$$

-continued $$W = \begin{bmatrix} w_1 & 0 & \cdots & \cdots & 0 \\ 0 & \cdots & 0 & & \vdots \\ \vdots & 0 & w_n & 0 & \vdots \\ \vdots & & 0 & \cdots & 0 \\ 0 & \cdots & \cdots & 0 & w_N \end{bmatrix}_{N \times 1}$$

$$\hat{X}_m = H_m^* W^{1/2} Z_m$$

with the weighted pseudo-inverse matrix:

$$H_m^* = (H_m^T (W^{1/2})^T (W^{1/2}) H_m)^{-1} H_m^T (W^{1/2})^T$$

or, equivalently:

$$\hat{X}_m = (H_m^T W H_m)^{-1} H_m^T W Z_m$$

The residues become:

$$R_m(\psi, \theta, \varphi) = \begin{bmatrix} \rho_{m,1}(\psi, \theta, \varphi) \\ \vdots \\ \rho_{m,n}(\psi, \theta, \varphi) \\ \vdots \\ \rho_{m,N}(\psi, \theta, \varphi) \end{bmatrix} = H_m \hat{X}_m - Z_m$$

The weighted sum of the squares of the residues becomes:

$$\Phi(\psi, \theta, \varphi) = \sum_{m=2}^{M} \sum_{n=1}^{N} w(\sigma_n, \alpha) \cdot |\rho_{m,n}(\psi, \theta, \varphi)|^2$$

$$\Phi(\psi, \theta, \varphi) = \sum_{m=2}^{M} \left\| W^{1/2}(H_m \hat{X}_m - Z_m) \right\|^2$$

$$= \sum_{m=2}^{M} (H_m \hat{X}_m - Z_m)^T W (H_m \hat{X}_m - Z_m)$$

Example:

P=3, $f_{1,m}(\sigma, \alpha) = 1$ $f_{2,m}(\sigma, \alpha) = 1/(\sigma - \sigma_0) \cdot \sin(\alpha)$ $f_{3,m}(\sigma, \alpha) = 1/(\sigma - \sigma_0) \cdot \cos(\alpha)$ Advantageously, the steps of determination of an antenna attitude hypothesis and of calculation of biases are performed iteratively and comprise steps of:
- initialization (501) of a so-called preceding hypothesis $(\psi_{n-1}, \theta_{n-1}, \phi_{n-1})$,
- calculation (502) of a current hypothesis $(\psi_n, \theta_n, \phi_n)$ from the preceding hypothesis $(\psi_{n-1}, \theta_{n-1}, \phi_{n-1})$,
- calculation of the sums of the residues squared (503) from the current hypothesis $(\psi_n, \theta_n, \phi_n)$,
- calculation (504) of a gradient from the sums of the residues squared,
- comparison (505) of the gradient with a predetermined threshold (S), if the gradient is below the threshold (S) then the calibration is finished (506), otherwise return to the step (502) of calculation of a current hypothesis with the current hypothesis as preceding hypothesis.

According to a variant embodiment of the invention, the calculation (502) of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \Phi(\psi_n, \theta_n, \varphi_n) \cdot \frac{\vec{Grad}\Phi(\psi_n, \theta_n, \varphi_n)}{\left\| \vec{Grad}\Phi(\psi_n, \theta_n, \varphi_n) \right\|^2} \text{ with}$$

$$\vec{Grad}\Phi(\psi_n, \theta_n, \varphi_n) \stackrel{def}{=} \begin{bmatrix} \frac{\partial \Phi}{\partial \psi}(\psi, \theta, \varphi) \\ \frac{\partial \Phi}{\partial \theta}(\psi, \theta, \varphi) \\ \frac{\partial \Phi}{\partial \varphi}(\psi, \theta, \varphi) \end{bmatrix}$$

such that, by approximation:

$$\Phi(\psi + d\psi, \theta + d\theta, \varphi + d\varphi) \cong \Phi(\psi, \theta, \varphi) + <\vec{Grad}\Phi(\psi_n, \theta_n, \varphi_n), \begin{bmatrix} d\psi \\ d\theta \\ d\varphi \end{bmatrix}>$$

or:

$$\Phi(\psi_{n+1}, \theta_{n+1}, \varphi_{n+1}) \cong$$

$$\Phi(\psi_n, \theta_n, \varphi_n) + <\vec{Grad}\Phi(\psi_n, \theta_n, \varphi_n), \begin{bmatrix} \psi_{n+1} - \psi_n \\ \theta_{n+1} - \theta_n \\ \varphi_{n+1} - \varphi_n \end{bmatrix}>$$

$$\Phi(\psi_{n+1}, \theta_{n+1}, \varphi_{n+1}) \cong \Phi(\psi_n, \theta_n, \varphi_n) - \Phi(\psi_n, \theta_n, \varphi_n) < \vec{Grad}\Phi(\psi_n, \theta_n, \varphi_n),$$

$$\vec{Grad}\Phi> / \left\| \vec{Grad}\Phi \right\|^2$$

$$\Phi(\psi_{n+1}, \theta_{n+1}, \varphi_{n+1}) \cong 0$$

In the case where the minimum of the likelihood criterion is zero, the method converges very rapidly towards this minimum. This is the ideal case in which there is an exact solution (when the residues are zero), that is to say, the case in which the $d_{m,n\ measure}$ are without measurement noise and in which the antenna biases $\beta_{0\ sensor\ m}$ are perfectly tabulated, in other words calibrated without measurement error in the factory.

In practice, it is improbable for the sum of the squares of the residues to be zero. It is therefore possible that the method does not converge very well.

According to another variant embodiment of the invention, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \alpha \cdot \vec{Grad}\Phi(\psi_n, \theta_n, \varphi_n)$$

with $\alpha$ being a realignment coefficient whose value is chosen to be between 0 and 1, in a fixed or changing manner.

This method is more robust and makes it possible to avoid the problems of divergences encountered with the preceding method.

The finite differences method can be used to calculate the gradient $\vec{Grad}\Phi(\psi_n,\theta_n,\phi_n)$:

$$\vec{Grad}\Phi(\psi,\theta,\varphi) = \lim_{d\to 0} \begin{bmatrix} \frac{\Phi(\psi+d\psi,\theta,\varphi)-\Phi(\psi,\theta,\varphi)}{d\psi} \\ \frac{\Phi(\psi,\theta+d\theta,\varphi)-\Phi(\psi,\theta,\varphi)}{d\theta} \\ \frac{\Phi(\psi,\theta,\varphi+d\varphi)-\Phi(\psi,\theta,\varphi)}{d\varphi} \end{bmatrix}$$

$$\cong \begin{bmatrix} \frac{\Phi(\psi+d\psi,\theta,\varphi)-\Phi(\psi,\theta,\varphi)}{d\psi} \\ \frac{\Phi(\psi,\theta+d\theta,\varphi)-\Phi(\psi,\theta,\varphi)}{d\theta} \\ \frac{\Phi(\psi,\theta,\varphi+d\varphi)-\Phi(\psi,\theta,\varphi)}{d\varphi} \end{bmatrix}$$

for small $d$

According to another embodiment, the gradient $\vec{Grad}\Phi(\psi_n,\theta_n,\phi_n)$ can be calculated by derivation:

$$\Phi(\psi,\theta,\varphi) = \sum_{m=2}^{M}\sum_{n=1}^{N} |\rho_{m,n}(\psi,\theta,\varphi)|^2$$

$$\frac{\partial \Phi}{\partial \psi}(\psi,\theta,\varphi) = \sum_{m=2}^{M}\sum_{n=1}^{N} \frac{\partial \rho_{m,n}}{\partial \psi} \cdot \rho_{m,n}(\psi,\theta,\varphi)$$

$$\rho_{m,n}(\psi,\theta,\varphi) = d_{m,n\,measured} - d_{m,n\,theoretical}(\psi,\theta,\varphi) - \tilde{\beta}_{1\,sensor\,m}(\psi,\theta,\varphi)$$

$$\frac{\partial \rho_{m,n}}{\partial \psi}(\psi,\theta,\varphi) = -\frac{\partial d_{m,n\,theoretical}}{\partial \psi}(\psi,\theta,\varphi) - \frac{\partial \tilde{\beta}_{1\,sensor\,m}}{\partial \psi}(\psi,\theta,\varphi)$$

$$\tilde{\beta}_{1\,sensor\,m}(\psi,\theta,\varphi) = \sum_{n=1}^{N}(d_{m,n\,measured}-d_{m,n\,theoretical}(\psi,\theta,\varphi))$$

$$\frac{\partial \tilde{\beta}_{1\,sensor\,m}}{\partial \psi}(\psi,\theta,\varphi) = -\sum_{n=1}^{N}\frac{\partial d_{m,n\,theoretical}}{\partial \psi}(\psi,\theta,\varphi)$$

$$d_{m,n\,theoretical}(\psi,\theta,\varphi) = 2\pi \cdot \vec{u}_{n\,sensors}(\psi,\theta,\varphi) \cdot (\vec{r}_{m\,sensors} - \vec{r}_{1\,sensors})/\lambda$$

$$\frac{\partial d_{m,n\,theoretical}}{\partial \psi}(\psi,\theta,\varphi) = 2\pi \cdot \frac{\partial \vec{u}_{n\,sensors}}{\partial \psi}(\psi,\theta,\varphi)\cdot(\vec{r}_{m\,sensors}-\vec{r}_{1\,sensors})/\lambda$$

(by abstracting $\beta_{0\,sensor\,m}(\sigma_n,\alpha_n)$)

$$\vec{u}_{n\,sensors}(\psi,\theta,\varphi) = M(\psi,\theta,\varphi) \cdot \vec{u}_{n\,TGL}$$

$$\frac{\partial \vec{u}_{n\,sensors}}{\partial \psi}(\psi,\theta,\varphi) = \frac{\partial M}{\partial \psi}(\psi,\theta,\varphi) \cdot \vec{u}_{n\,TGL}$$

$$M(\psi,\theta,\varphi) = \begin{bmatrix} 1 & 0 & 0 \\ 0 & \cos\varphi & -\sin\varphi \\ 0 & \sin\varphi & \cos\varphi \end{bmatrix}\begin{bmatrix} \cos\theta & 0 & -\sin\theta \\ 0 & 1 & 0 \\ \sin\theta & 0 & \cos\theta \end{bmatrix}\begin{bmatrix} \cos\psi & \sin\psi & 0 \\ -\sin\psi & \cos\psi & 0 \\ 0 & 0 & 1 \end{bmatrix}$$

$$\frac{\partial M}{\partial \psi}(\psi,\theta,\varphi) = \begin{bmatrix} 1 & 0 & 0 \\ 0 & \cos\varphi & -\sin\varphi \\ 0 & \sin\varphi & \cos\varphi \end{bmatrix}\begin{bmatrix} \cos\theta & 0 & -\sin\theta \\ 0 & 1 & 0 \\ \sin\theta & 0 & \cos\theta \end{bmatrix}\begin{bmatrix} -\sin\psi & \cos\psi & 0 \\ -\cos\psi & -\sin\psi & 0 \\ 0 & 0 & 0 \end{bmatrix}$$

for $\frac{\partial \Phi}{\partial \psi}(\psi,\theta,\varphi)$ $$\frac{\partial M}{\partial \theta}(\psi,\theta,\varphi) = \begin{bmatrix} 1 & 0 & 0 \\ 0 & \cos\varphi & -\sin\varphi \\ 0 & \sin\varphi & \cos\varphi \end{bmatrix}\begin{bmatrix} -\sin\theta & 0 & -\cos\theta \\ 0 & 0 & 0 \\ \cos\theta & 0 & -\sin\theta \end{bmatrix}\begin{bmatrix} \cos\psi & \sin\psi & 0 \\ -\sin\psi & \cos\psi & 0 \\ 0 & 0 & 1 \end{bmatrix}$$

for $\frac{\partial \Phi}{\partial \theta}(\psi,\theta,\varphi)$ $$\frac{\partial M}{\partial \varphi}(\psi,\theta,\varphi) = \begin{bmatrix} 0 & 0 & 0 \\ 0 & -\sin\varphi & -\cos\varphi \\ 0 & \cos\varphi & -\sin\varphi \end{bmatrix}\begin{bmatrix} \cos\theta & 0 & -\sin\theta \\ 0 & 1 & 0 \\ \sin\theta & 0 & \cos\theta \end{bmatrix}\begin{bmatrix} \cos\psi & \sin\psi & 0 \\ -\sin\psi & \cos\psi & 0 \\ 0 & 0 & 1 \end{bmatrix}$$

for $\frac{\partial \Phi}{\partial \varphi}(\psi,\theta,\varphi)$

This exact calculation method is not necessarily more advantageous in terms of complexity (number of arithmetical operations) compared to the finite differences method requiring only the calculation of the likelihood criterion $\Phi(\psi,\theta,\phi)$ at four points: $(\psi,\theta,\phi)$ $(\psi+d\psi,\theta,\phi)$ $(\psi,\theta+d\theta,\phi)$ and $(\psi,\theta,\phi+d\phi)$ The method for calibrating an antenna of a receiver according to the invention calculates sensor biases from phase shifts $d_{m,n\,measure}$ for each of the sensors $c_1, \ldots c_M$ for each of the signals $s_1, \ldots, s_N$.

The devices for processing the signal according to the prior art are not designed to perform such measurements.

Figure 6:
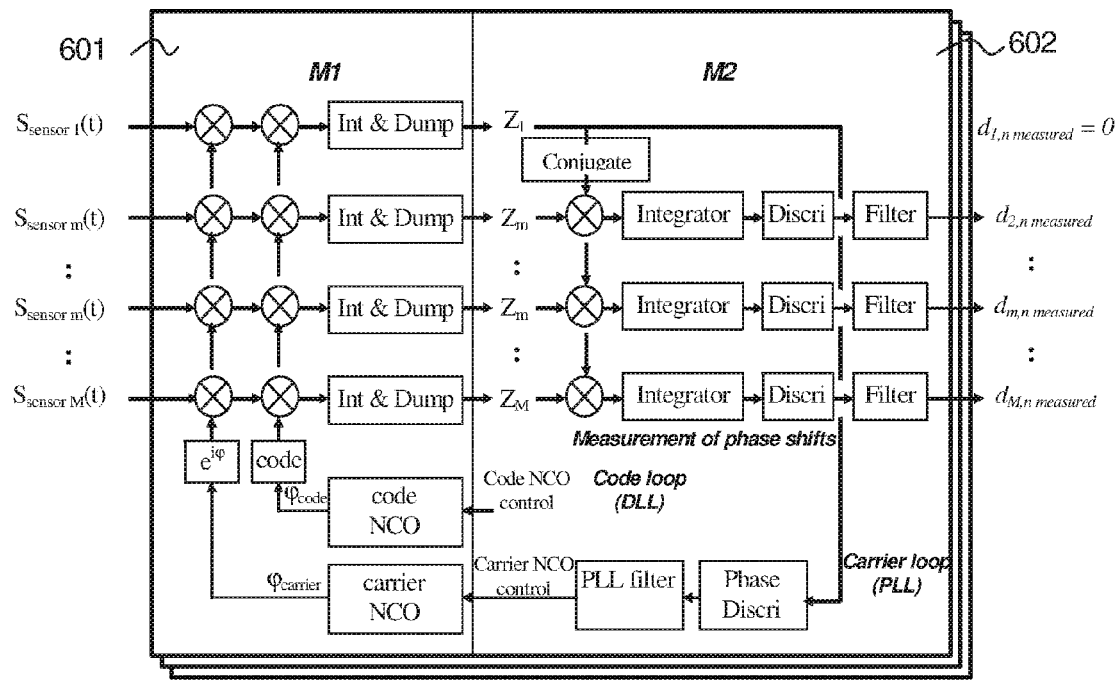
FIG. 6 shows an exemplary embodiment of a device according to the invention.

Thus, the invention also relates to a device for processing signals originating from a plurality of satellites comprising, for each satellite, suitable means for processing the signal. FIG. 6 shows an exemplary embodiment of a device according to the invention.

Each of said suitable means for processing the signal comprises a first module M1 (601) preferably produced as hardware and a second module M2 (602) preferably produced as software. The hardware module receives signals $S_{sensor\,1}, \ldots, S_{sensor\,M}$, each originating from the sensors of the antenna, digitized by analogue-digital converters (ADC) at a frequency Fe. The hardware module produces, for each of these sensor signals $S_{sensor\,1}, \ldots, S_{sensor\,M}$, a signal $Z_1, \ldots, Z_M$. The signals $Z_1, \ldots, Z_M$ of the channel n are the results, expressed in complex numbers, of the correlation of the signals received respectively on the sensors $C_1, \ldots, C_M$ by a local signal consisting of a complex carrier and a spreading code specific to the satellite assigned to the channel n, according to the state of the art of the demodulation of GNSS (Global Navigation Satellite System) signals. The correlation consists in multiplying the received signals by the local signal ($\phi_{carrier}$ and $\phi_{code}$) then in integrating for each time interval ("Integrate and Dump" block). At the end of an interval (period of the frequency Fw) each integrator produces the result $Z_m$ and begins again at zero. The complex local carrier is generated from a phase produced by a numerically-controlled oscillator (NCO), controlled in frequency by the carrier loop, according to the state of the art (carrier NCO block). The local code is produced by a code generator from a code phase supplied by a code NCO controlled in frequency by the code loop, according to the state of the art (code NCO block). The demodulation is performed in digital hardware (FPGA or ASIC). The carrier loop and the code loop, not represented here, are produced as software. The carrier loop uses, for example, the correlation channel of the sensor 1 and applies a phase discriminator to $Z_1$ (phase discri. block), which supplies a loop corrector (PLL filter block), then the carrier NCO, according to the state of the art.

The software module measures, for each of the signals $Z_1, \ldots, Z_M$, a phase shift $d_{1,n\ measure}, \ldots d_{M,n\ measure}$.

For this, the software performs the complex multiplication of the results $Z_2, \ldots, Z_M$ of the correlation by conjugate of $Z_1$, then the integration of the products (complex number) over intervals that are multiples of $1/Fw$ (integrator blocks). Phase discriminators (discri. blocks) are used to extract the argument (angle) from the complex results of the integration, a crude estimation of the measured phase shift $d_{m,n\ measure}$. Then, finally, a filtering (filter blocks) supplies the final measurement of the phase shift.

The demodulation of the signals, digitized at the frequency Fe, is preferably made by hardware in a dedicated digital component such as an ASIC or FPGA. It requires a very high calculation frequency which is more difficult to perform by software.

DEFINITIONS

Notation: $\mathrm{expi}(\phi) = \exp(j \cdot \phi) = e^{j\phi}$ ($j^2 = -1$)

$F_r$: Residual frequency of the base band digitized signals ($F_r$ small compared to Fe)

$\theta_{m,n}$: Phase shift at the instant $t=0$ of the signal received from the source n on the sensor m $\theta_n$: Phase shift at the instant $t=0$ of the local signal in the channel n $C_n(t)$: spreading code of the signal received from the source n (t is the current time)

$R(\tau)$: Code self-correlation function $R(\tau) = 1 - |\tau|$ if $|\tau| < 1$ $R(\tau=0) = 1$ $R(\tau) = 0$ otherwise $R_{n,n}(\tau) = 1/T \int_{[kT,(k+1)T]} C_n(t) \cdot C_n(t-\tau) dt = R(\tau)$ $R_{n,p}(\tau) = 1/T \int_{[kT,(k+1)T]} C_p(t) \cdot C_n(t-\tau) dt \cong 0$ if $p \neq n$ (n and p are the indices of two sources, [kT,(k+1)T] corresponds to the $k^{th}$ integration interval in the correlators)

Received Signals:

The signal received on the sensor m is the sum of the signals received from the different visible sources plus the noise.

$S_{received\ m}(t) = \Sigma_{n=1,\ldots,N} S_{received\ m,n}(t) + \text{noise}$ Signal received from the source n on the sensor m:

$S_{received\ m,n}(t) = A \cdot \mathrm{expi}(\phi_{carrier\ received\ m,n}(t)) \cdot C_n(\phi_{code\ received\ n}(t))$ $S_{received\ m,n}(t) = A \cdot \mathrm{expi}(2\pi \cdot F_r \cdot t + \theta_{m,n}) \cdot C_n(t)$ (A is the amplitude of the signal received)

Local Signal in the Channel N:

$S_{local\ n}(t) = \mathrm{expi}(-\phi_{local\ carrier\ n}(t)) \cdot C_n(\phi_{local\ code\ n}(t))$ $S_{local\ n}(t) = \mathrm{expi}(-2\pi \cdot F_r \cdot t - \theta_n) \cdot C_n(t-\tau)$ Correlation:

The correlator performs the operation:

$Z_{m,n}(k) = 1/T \int_{[kT,(k+1)T]} S_{received\ m}(t) \cdot S_{local\ n}(t) dt$ T: coherent integration time (typically T=20 ms)

(k is the index of the $k^{th}$ integration interval [kT,(k+1)T] in the correlators)

Since the satellite codes are decorrelated ($R_{n,p}(\tau) \cong 0$), it is possible to write:

$Z_{m,n}(k) = 1/T \int_{[kT,(k+1)T]} S_{received\ m,n}(t) \cdot S_{local\ n}(t) dt + \text{noise}$ $Z_{m,n}(k) = 1/T \int_{[kT,(k+1)T]} \mathrm{expi}(\phi_{carrier\ received\ m,n}(t) - \phi_{local\ carrier\ n}(t)) \cdot C_n(\phi_{code\ received\ n}(t)) \cdot C_n(\phi_{local\ code\ n}(t)) dt$ $Z_{m,n}(k) = A \cdot \mathrm{expi}(\theta_{m,n} - \theta_n) \cdot 1/T \int_{[kT,(k+1)T]} C_n(t) \cdot C_n(t-\tau) dt + \text{noise}$ $Z_{m,n}(k) = A \cdot \mathrm{expi}(\theta_{m,n} - \theta_n) \cdot R(\tau) + \text{noise}$ It is assumed that the local code of the channel n is in phase with the code received from the satellite n, by virtue of the code loop, produced according to the prior art. Hence $\tau=0$ and $R(\tau)=1$ $Z_{m,n}(k) = A \cdot \mathrm{expi}(\theta_{m,n} - \theta_n) + \text{noise}$ The tracking loops (code and carrier) are produced as software because they operate at low frequency (Fw=50 Hz), they use more complex mathematical functions, and have different modes (searching, transition, tracking, degraded tracking, etc.).

A choice is made to implement the carrier phase loop (PLL Phase Lock Loop) on the sensor 1 arbitrarily; any other sensor could equally be used.

Phase Discriminator for the Signal N:

$D\phi_n(k) = \mathrm{argument}(Z_{1,n}(k))$ $D\phi_n(k) = \theta$ $Z_{1,n}(k) = \rho e^{j\theta}$ $\rho$ modulus, $\theta$ argument $D\phi_n(k) = \mathrm{arctangent}(I,Q)$ $Z_{1,n}(k) = I + j \cdot Q$ I real part, Q imaginary part Hence:

$D\phi_n(k) = \theta_{1,n} - \theta_n + \text{noise}$ (rad)

Loop Corrector (PLL Filter):

$A(k) = A(k-1) + T \cdot K_1 \cdot D\phi(k) \cdot \lambda_{carrier}/(2\pi)(\text{m/s}^2)$ $V(k) = V(k-1) + TA(k) + T \cdot K_2 \cdot D\phi(k) \cdot \lambda_{carrier}/(2\pi)(\text{m/s})$ $C(k) = V(k) + K_3 \cdot D\phi(k) \cdot \lambda_{carrier}/(2\pi)(\text{m/s})$ (A and V are variables internal to the correlator, K1, K2, K3 are realignment gains and C is the control of the output of the correlator).

NCO Control:

$C_{carrier\ NCO}(k) = C(k)/\lambda_{carrier}$ (Hz)

The estimation of the phase shifts is preferably performed by software because it is a low frequency processing operation (Fw=50 Hz).

Complex Products:

$\Pi_{m,n}(k) = Z_{m,n}(k) \times \mathrm{conjugate}(Z_{1,n}(k))$ $\Pi_{m,n}(k) = A^2 \cdot \mathrm{expi}(\theta_{m,n} - \theta_{1,n}) + \text{noise}$ Coherent Integration:

$\Pi'_{m,n}(p) = \Sigma_{k=p \cdot K+1,\ldots,(p+1) \cdot K} \Pi_{m,n}(k) = K \cdot A^2 \cdot \mathrm{expi}(\theta_{m,n} - \theta_{1,n}) + \text{noise}$ Raw Discriminator:

$d_{m,n\ raw}(p) = \mathrm{argument}(\Pi'_{m,n}(p)) = \theta_{m,n} - \theta_{1,n} + \text{noise}$ Filter Discriminator: (First Order Infinite Impulse Response IIR Filter):

$d_{m,n\ measured}(p) = e^{-\tau 0} \cdot d_{m,n\ measured}(p) + (1-e^{-\tau 0}) \cdot d_{m,n\ raw}(p)$ $\tau_0$: Time constant of the filter The quantity $d_{m,n\ measured}(p)$ supplies an estimation of the phase shift of the satellite n signal received on the sensor m relative to the sensor 1.

In this phase shift, two components are found:
one due to the optical path difference between the sensors, linked to the attitude of the antenna relative to the direction of the satellite,
the other due to the biases of the analogue channels between the phase centres of the sensors and the analogue-digital converter.

To estimate the bias part, the component linked to the attitude of the antenna, that is not a priori known, must be eliminated. The invention proposes simultaneously identifying the two components through measured phase shifts, by resolving a system of equations with a number of unknowns (biases and attitudes), that is nonlinear.

Since the system is not linear relative to the three attitude components that are Euler angles ($\psi,\theta,\phi$), the invention proposes conducting a search in the domain of the Euler angles. For each attitude hypothesis ($\psi, \theta, \phi$) considered, the system, which becomes linear (because three unknowns have been set, which are not linearly dependent), is resolved and a likelihood criterion is calculated, which uses the redundancy of the measurements relative to the number of unknowns. Finally, the hypothesis ($\psi, \theta, \phi$) which gives the best criterion is retained. The likelihood criterion measures the consistency between the measurements, which are redundant.

Figure 7:
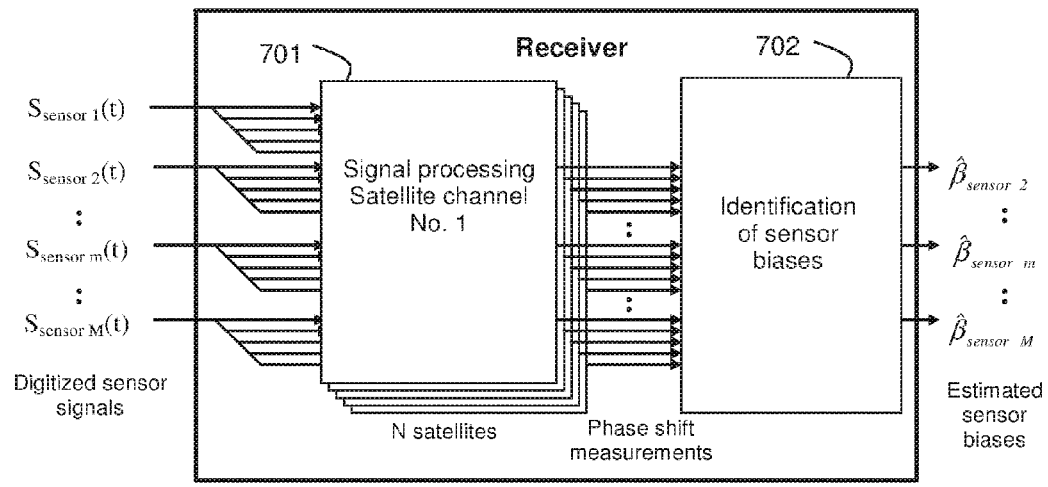
FIG. 7 shows an exemplary embodiment of a receiver according to the invention.

The invention also relates to a receiver of satellite signals. FIG. 7 shows an exemplary embodiment of a receiver according to the invention. The receiver comprises a plurality of sensors distributed on an antenna. The receiver comprises means for digitizing the signals originating from the sensors, a signal processing device 701 according to the invention and means 702 for implementing the method according to the invention.

The calculated biases can then be used by antenna processing methods.

The invention claimed is:

1. Method for calibrating an antenna of a receiver of signals originating from a plurality of sources, said receiver comprising a plurality of sensors mounted on a moving craft, characterized in that it comprises the following steps:
measurement of a phase shift for each of the sensors on each of the signals,
determination of at least one attitude value of the antenna, said attitude being defined by a set of coordinates,
calculation, for each of the sensors on each of the signals, of a theoretical phase shift as a function of the attitude of the antenna, from directions of arrival of the signals,
calculation of a bias for each of the sensors from the measured phase shifts and from the theoretical phase shifts of the sensor and;
using the calculated bias for each of the sensors to calibrate the respective sensor and thereby calibrate the antenna wherein
the step of determination of at least one attitude value of the antenna comprises the determination of a plurality of antenna attitude hypotheses,
for each determined attitude hypothesis,
calculation of a bias for each of the sensors from the measured phase shifts and from the theoretical phase shifts of the sensor,
calculation of a likelihood indicator of the attitude hypothesis, from the measured phase shifts, from the theoretical phase shifts and from the calculated biases,
selection of the biases for which the value of the likelihood indicator is the lowest wherein the calibration and the selection of the values for the biases of the sensors may be repeated on the moving craft,
wherein the bias of the sensors being independent of the directions of arrival of the signals, the calculation of a bias $\tilde{\beta}_{1\ sensor\ m}$ for each of the sensors from the measured phase shifts and from the theoretical phase shifts of the sensor is performed according to a weighted average, $$\tilde{\beta}_{1\ sensor\ m}(\psi, \theta, \varphi) = \frac{1}{N}\sum_{n=1}^{N} w(\sigma_n, \alpha_n) \cdot (d_{m,n\ measured} - d_{m,n\ theoretical}(\psi, \theta, \varphi))$$

with $\tilde{\beta}_{1\ sensor\ m}(\psi,\theta,\phi)$ being the bias of a sensor m, for a heading $\psi$, a trim $\theta$ and an inclination $\phi$ and $w(\sigma_n, \alpha_n)$ being a weighting of the source n, dependent on $\sigma_n$, an angle of elevation in a sensor coordinate system and on $\alpha_n$, an azimuth angle in the sensor coordinate system, $d_{m,n\ measured}$ being the measured phase shift for the sensor m for the signal n, $d_{m,n\ theoretical}(\psi,\theta,\phi)$ being the theoretical phase shift for the sensor m for the signal n and for the heading $\psi$, the trim $\theta$ and the inclination $\phi$, and N being the number of signals.

2. Method for calibrating an antenna of a receiver according to claim 1, in which the step of determination of at least one attitude value of the antenna comprises the determination of a single value determined by suitable measurement means.

3. Method for calibrating an antenna of a receiver according to claim 1, in which the calculation, for each of the sensors on each of the signals, of theoretical phase shift also takes into account predetermined values of the sensor biases linked to receiver defects and dependent on the direction of arrival of the source signals, the purpose of the calibration being to identify residual sensor biases independent of the direction of arrival of the signals.

4. Method for calibrating an antenna of a receiver according to claim 3, in which, the coordinates defining the attitude of the antenna being the heading, the trim and the inclination, the calculation of the likelihood indicator comprises the calculation of a residue for each signal/sensor pair, the residue for a given sensor and signal according to the relationship:

$$\rho_{m,n}(\psi,\theta,\phi) = d_{m,n\ measured} - d_{m,n\ theoretical}(\psi,\theta,\phi) - \tilde{\beta}_{1\ sensor\ m}(\psi,\theta,\phi),$$

with $\rho_{m,n}(\psi,\theta,\phi)$ being the residue associated with the pair comprising signal n and sensor m, $d_{m,n\ measured}$ being the measured phase shift for the sensor m for the signal n, $d_{m,n\ theoretical}(\psi,\theta,\phi)$ being the theoretical phase shift for the sensor m for the signal n and for the heading $\psi$, the trim $\theta$ and the inclination $\phi$, $\tilde{\beta}_{1\ sensor\ m}(\psi,\theta,\phi)$ being an estimated value of the bias of the sensor m for the heading $\psi$, the trim $\theta$ and the inclination $\phi$,
and in that the likelihood indicator is a weighted sum of the squares of the residues according to the following relationship:

$$\Phi(\psi, \theta, \varphi) = \sum_{m=2}^{M}\sum_{n=1}^{N} w(\sigma_n, \alpha_n) \cdot |\rho_{m,n}(\psi, \theta, \varphi)|^2$$

with $\Phi(\psi,\theta,\phi)$ being the likelihood indicator for the heading $\psi$, the trim $\theta$ and the inclination $\phi$, $\rho_{m,n}(\psi,\theta,\phi)$ being the residue associated with the pair comprising signal n and sensor m and $w(\sigma_n, \alpha_n)$ being a weighting of the source n, dependent on $\sigma_n$, the angle of elevation in the sensor coordinate system and on $\alpha_n$, the azimuth angle in the sensor coordinate system.

5. Method for calibrating an antenna of a receiver according to claim 4, in which, the calculation of a bias $\beta_{1\ sensor\ m}$ for each of the sensors from the measured phase shifts and from the theoretical phase shifts of the sensor is performed according to a weighted least squares method.

6. Method for calibrating an antenna of a receiver according to claim 1, in which, the purpose of the calibration being to identify residual biases dependent on the direction of arrival of the signals, the biases of the sensors are expressed by linear combinations, comprising coefficients, functions of the directions of arrival of the signals in the antenna coordinate system.

7. Method for calibrating an antenna of a receiver according to claim 6, in which the coefficients of the linear combinations are determined by means of a weighted least squares method.

8. Method for calibrating an antenna of a receiver according to claim 6, in which, the coordinates defining the attitude of the antenna being the heading, the trim and the inclination, the calculation of the likelihood indicator follows the following relationship:

$$\Phi(\psi, \theta, \varphi) = \sum_{m=2}^{M} \left\| W^{1/2} (H_m \hat{X}_m - Z_m) \right\|^2$$
$$= \sum_{m=2}^{M} (H_m \hat{X}_m - Z_m)^T W (H_m \hat{X}_m - Z_m)$$

with $\Phi(\psi,\theta,\varphi)$ being the likelihood indicator for the heading $\psi$, the trim $\theta$ and the inclination $\varphi$, and W being a diagonal weighting matrix, H being a matrix of the functions of the directions of arrival of the signals in the antenna coordinate system, X being a matrix of coefficients and Z being defined as follows:

$$Z_m = \begin{bmatrix} d_{m,1\ measured} - d_{m,1\ theoretical}(\psi, \theta, \varphi) \\ \vdots \\ d_{m,n\ measured} - d_{m,n\ theoretical}(\psi, \theta, \varphi) \\ \vdots \\ d_{m,N\ measured} - d_{m,N\ theoretical}(\psi, \theta, \varphi) \end{bmatrix}_{N \times 1}$$

9. Method for calibrating an antenna of a receiver according to claim 5, in which, the steps of determination of an antenna attitude hypothesis and of calculation of biases are performed iteratively and comprise steps of:
 initialization of a so-called preceding hypothesis
 calculation of a current hypothesis from the preceding hypothesis,
 calculation of the sums of the residues squared from the current hypothesis,
 calculation of a gradient from the sums of the residues squared,
 comparison of the gradient with a predetermined threshold, if the gradient is below the threshold then the calibration is finished, otherwise return to the step of calculation of a current hypothesis with the current hypothesis as preceding hypothesis.

10. Method for calibrating an antenna of a receiver according to claim 1, in which, the steps of determination of an antenna attitude hypothesis and of calculation of biases are performed iteratively and comprise steps of:
 initialization of a so-called preceding hypothesis,
 calculation of a current hypothesis from the preceding hypothesis,
 calculation of the sums of the residues squared from the current hypothesis,
 calculation of a gradient from the sums of the residues squared,
 comparison of the gradient with a predetermined threshold, if the gradient is below the threshold then the calibration is finished, otherwise return to the step of calculation of a current hypothesis with the current hypothesis as preceding hypothesis.

11. Method for calibrating an antenna of a receiver according to claim 7, in which, the steps of determination of an antenna attitude hypothesis and of calculation of biases are performed iteratively and comprise steps of:
 initialization of a so-called preceding hypothesis,
 calculation of a current hypothesis from the preceding hypothesis
 calculation of the sums of the residues squared from the current hypothesis,
 calculation of a gradient from the sums of the residues squared,
 comparison of the gradient with a predetermined threshold, if the gradient is below the threshold then the calibration is finished, otherwise return to the step of calculation of a current hypothesis with the current hypothesis as preceding hypothesis.

12. Method for calibrating an antenna of a receiver according to claim 8, in which, the steps of determination of an antenna attitude hypothesis and of calculation of biases are performed iteratively and comprise steps of:
 initialization of a so-called preceding hypothesis,
 calculation of a current hypothesis from the preceding hypothesis,
 calculation of the sums of the residues squared from the current hypothesis,
 calculation of a gradient from the sums of the residues squared,
 comparison of the gradient with a predetermined threshold, if the gradient is below the threshold then the calibration is finished, otherwise return to the step of calculation of a current hypothesis with the current hypothesis as preceding hypothesis.

13. Method for calibrating an antenna of a receiver according to claim 9, in which, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \Phi(\psi_n, \theta_n, \varphi_n) \cdot \frac{\vec{Grad}\Phi(\psi_n, \theta_n, \varphi_n)}{\left\| \vec{Grad}\Phi(\psi_n, \theta_n, \varphi_n) \right\|^2}$$

$$\text{with } \vec{Grad}\Phi(\psi, \theta, \varphi) \stackrel{def}{=} \begin{bmatrix} \frac{\partial \Phi}{\partial \psi}(\psi, \theta, \varphi) \\ \frac{\partial \Phi}{\partial \theta}(\psi, \theta, \varphi) \\ \frac{\partial \Phi}{\partial \varphi}(\psi, \theta, \varphi) \end{bmatrix}$$

with $\vec{Grad}\Phi$ being the gradient of the likelihood indicator that is a function of $\psi$, the heading, $\theta$, the trim, and $\varphi$, the inclination.

14. Method for calibrating an antenna of a receiver according to claim 10, in which, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \Phi(\psi_n, \theta_n, \varphi_n) \cdot \frac{\vec{Grad}\Phi(\psi_n, \theta_n, \varphi_n)}{\left\|\vec{Grad}\Phi(\psi_n, \theta_n, \varphi_n)\right\|^2}$$

$$\text{with } \vec{Grad}\Phi(\psi_n, \theta_n, \varphi_n) \stackrel{def}{=} \begin{bmatrix} \frac{\partial \Phi}{\partial \psi}(\psi, \theta, \varphi) \\ \frac{\partial \Phi}{\partial \theta}(\psi, \theta, \varphi) \\ \frac{\partial \Phi}{\partial \varphi}(\psi, \theta, \varphi) \end{bmatrix}$$

with $\vec{Grad}\Phi$ being the gradient of the likelihood indicator that is a function of $\psi$, the heading, $\theta$, the trim, and $\varphi$, the inclination.

15. Method for calibrating an antenna of a receiver according to claim 11, in which, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \Phi(\psi_n, \theta_n, \varphi_n) \cdot \frac{\vec{Grad}\Phi(\psi_n, \theta_n, \varphi_n)}{\left\|\vec{Grad}\Phi(\psi_n, \theta_n, \varphi_n)\right\|^2}$$

$$\text{with } \vec{Grad}\Phi(\psi, \theta, \varphi) \stackrel{def}{=} \begin{bmatrix} \frac{\partial \Phi}{\partial \psi}(\psi, \theta, \varphi) \\ \frac{\partial \Phi}{\partial \theta}(\psi, \theta, \varphi) \\ \frac{\partial \Phi}{\partial \varphi}(\psi, \theta, \varphi) \end{bmatrix}$$

with $\vec{Grad}\Phi$ being the gradient of the likelihood indicator that is a function of $\psi$, the heading, $\theta$, the trim, and $\varphi$, the inclination.

16. Method for calibrating an antenna of a receiver according to claim 12, in which, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \Phi(\psi_n, \theta_n, \varphi_n) \cdot \frac{\vec{Grad}\Phi(\psi_n, \theta_n, \varphi_n)}{\left\|\vec{Grad}\Phi(\psi_n, \theta_n, \varphi_n)\right\|^2}$$

$$\text{with } \vec{Grad}\Phi(\psi, \theta, \varphi) \stackrel{def}{=} \begin{bmatrix} \frac{\partial \Phi}{\partial \psi}(\psi, \theta, \varphi) \\ \frac{\partial \Phi}{\partial \theta}(\psi, \theta, \varphi) \\ \frac{\partial \Phi}{\partial \varphi}(\psi, \theta, \varphi) \end{bmatrix}$$

with $\vec{Grad}\Phi$ being the gradient of the likelihood indicator that is a function of $\psi$, the heading, $\theta$, the trim, and $\varphi$, the inclination.

17. Method for calibrating an antenna of a receiver according to claim 9, in which, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \alpha \cdot \vec{Grad}\Phi(\psi_n, \theta_n, \varphi_n)$$

with $\vec{Grad}\Phi$ being the gradient of the likelihood indicator that is a function of $\psi$, the heading, $\theta$, the trim, and $\varphi$, the inclination, and $\alpha$ being a realignment coefficient.

18. Method for calibrating an antenna of a receiver according to claim 10, in which, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \alpha \cdot \vec{Grad}\Phi(\psi_n, \theta_n, \varphi_n)$$

with $\vec{Grad}\Phi$ being the gradient of the likelihood indicator that is a function of $\psi$, the heading, $\theta$, the trim, and $\varphi$, the inclination, and $\alpha$ being a realignment coefficient.

19. Method for calibrating an antenna of a receiver according to claim 11, in which, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \alpha \cdot \vec{Grad}\Phi(\psi_n, \theta_n, \varphi_n)$$

with $\vec{Grad}\Phi$ being the gradient of the likelihood indicator that is a function of $\psi$, the heading, $\theta$, the trim, and $\varphi$, the inclination, and $\alpha$ being a realignment coefficient.

20. Method for calibrating an antenna of a receiver according to claim 12, in which, the calculation of a current hypothesis from a preceding hypothesis follows the following relationship:

$$\begin{bmatrix} \psi_{n+1} \\ \theta_{n+1} \\ \varphi_{n+1} \end{bmatrix} = \begin{bmatrix} \psi_n \\ \theta_n \\ \varphi_n \end{bmatrix} - \alpha \cdot \vec{Grad}\Phi(\psi_n, \theta_n, \varphi_n)$$

with $\vec{Grad}\Phi$ being the gradient of the likelihood indicator that is a function of $\psi$, the heading, $\theta$, the trim, and $\varphi$, the inclination, and $\alpha$ being a realignment coefficient.

\* \* \* \* \*